(12) United States Patent
Kim et al.

(10) Patent No.: US 12,542,240 B2
(45) Date of Patent: Feb. 3, 2026

(54) MULTILAYERED CAPACITOR AND MANUFACTURING METHOD THEREOF

(71) Applicant: SAMSUNG ELECTRO-MECHANICS CO., LTD., Suwon-si (KR)

(72) Inventors: Jinseong Kim, Suwon-si (KR); Myungwoo Lee, Suwon-si (KR); Wonsik Jeong, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 153 days.

(21) Appl. No.: 18/229,857

(22) Filed: Aug. 3, 2023

(65) Prior Publication Data
US 2024/0282524 A1    Aug. 22, 2024

(30) Foreign Application Priority Data
Feb. 20, 2023    (KR) .................. 10-2023-0022146

(51) Int. Cl.
*H01G 4/12*    (2006.01)
*C04B 35/468*    (2006.01)
(Continued)

(52) U.S. Cl.
CPC ....... *H01G 4/1227* (2013.01); *C04B 35/4682* (2013.01); *C04B 35/6262* (2013.01);
(Continued)

(58) Field of Classification Search
CPC ...... H01G 4/1227; H01G 4/30; H01G 4/1209; H01G 4/12; H01G 4/1245; H01G 4/012; H01G 13/00; C04B 35/4682; C04B 35/6262; C04B 35/62655; C04B 35/62675; C04B 35/64; C04B 37/003; C04B 2235/3217; C04B 2235/3224;
(Continued)

(56) References Cited

U.S. PATENT DOCUMENTS 7,297,403 B2* 11/2007 Ito ................. C04B 35/62805
428/404
10,315,928 B2* 6/2019 Ajichi ................. C01G 23/006
(Continued)

FOREIGN PATENT DOCUMENTS

JP    2006-027971 A    2/2006
JP    2006-111466 A    4/2006
(Continued)

OTHER PUBLICATIONS

European Search Report dated Apr. 4, 2024 issued in European Patent Application No. 23192602.3.

*Primary Examiner* — Dion R. Ferguson
(74) *Attorney, Agent, or Firm* — Morgan, Lewis & Bockius LLP

(57) ABSTRACT

Disclosed is a multilayered capacitor including a capacitor body including a dielectric layer and an internal electrode and an external electrode disposed outside the capacitor body. The dielectric layer includes a plurality of dielectric crystal grains, the dielectric crystal grains include barium titanate as a main component and $Dy_2O_3$ as a subcomponent, and the barium titanate includes about 0.005 to about 0.065 wt % of Cl.

19 Claims, 11 Drawing Sheets

(51) Int. Cl.
   *C04B 35/626* (2006.01)
   *C04B 35/64* (2006.01)
   *C04B 37/00* (2006.01)
   *H01G 4/30* (2006.01)

(52) U.S. Cl.
   CPC .. *C04B 35/62655* (2013.01); *C04B 35/62675* (2013.01); *C04B 35/64* (2013.01); *C04B 37/003* (2013.01); *H01G 4/30* (2013.01); *C04B 2235/3217* (2013.01); *C04B 2235/3224* (2013.01); *C04B 2235/3236* (2013.01); *C04B 2235/3239* (2013.01); *C04B 2235/3244* (2013.01); *C04B 2235/3267* (2013.01); *C04B 2235/3418* (2013.01); *C04B 2235/442* (2013.01); *C04B 2235/6567* (2013.01); *C04B 2237/123* (2013.01); *C04B 2237/346* (2013.01)

(58) Field of Classification Search
   CPC .... C04B 2235/3236; C04B 2235/3239; C04B 2235/3244; C04B 2235/3267; C04B 2235/3418; C04B 2235/442; C04B 2235/6567; C04B 2237/123; C04B 2237/346; C04B 35/62645; C04B 2235/5409; C04B 2235/77; C04B 35/6325; C04B 2235/3206; C04B 2235/3213; C04B 35/49; C04B 2235/3215; C04B 2235/3232; C04B 2235/3293; C04B 2235/441; C04B 2235/444; C04B 2235/724

See application file for complete search history.

(56) References Cited

U.S. PATENT DOCUMENTS

| | | | |
|---|---|---|---|
| 11,581,142 B2* | 2/2023 | Fujii | H01G 4/1218 |
| 2006/0088709 A1* | 4/2006 | Ito | C04B 35/628 |
| | | | 428/404 |
| 2008/0220964 A1 | 9/2008 | Fujikawa et al. | |
| 2009/0202426 A1* | 8/2009 | Yamashita | B82Y 30/00 |
| | | | 423/598 |
| 2011/0157769 A1 | 6/2011 | Kang et al. | |
| 2021/0065978 A1* | 3/2021 | Fujii | C04B 35/4682 |
| 2021/0147298 A1* | 5/2021 | Taniguchi | C04B 35/622 |
| 2024/0282524 A1* | 8/2024 | Kim | C04B 35/6262 |

FOREIGN PATENT DOCUMENTS

| | | | | |
|---|---|---|---|---|
| JP | 2009-190912 A | | 8/2009 | |
| JP | 4428187 B2 | * | 3/2010 | ......... C04B 35/4682 |
| JP | 2021034631 A | * | 3/2021 | ............ B32B 18/00 |
| KR | 10-2011-0078333 A | | 7/2011 | |

* cited by examiner

MULTILAYERED CAPACITOR AND MANUFACTURING METHOD THEREOF

CROSS-REFERENCE TO RELATED APPLICATION

This application claims priority to and the benefit of Korean Patent Application No. 10-2023-0022146 filed in the Korean Intellectual Property Office on Feb. 20, 2023, the entire contents of which are incorporated herein by reference.

TECHNICAL FIELD

This disclosure relates to a multilayered capacitor and a method of manufacturing the same.

BACKGROUND

Recently, as the multi-functionality and down-sizing of electronic devices have been rapidly progressing, the down-sizing and performance enhancement of electronic components are also proceeding at a fast speed. In addition, the demand for high reliability of electric devices used in automobiles or network equipment, and electronic components for industrial use is also greatly increasing.

In order to meet such market demands, technology development competition for passive components such as inductors, capacitors, or resistors is accelerating. In particular, many efforts are required to preoccupy a market by developing various products of multilayered ceramic capacitor (MLCC), whose use and usage as a passive component are continuously increasing.

Furthermore, a multilayered capacitor is a capacitor manufactured by stacking dielectric layers and internal electrodes layer by layer, and is used in various electronic devices such as mobile phones, laptops, and LCD TVs. In particular, due to the advancement of automobile electron control technology, demands for vehicular applications is increasing, and as the down-sizing and high-functionality of vehicular electronic devices progresses, high temperature and moisture resistance characteristics of multilayered capacitors are being required.

One of the main materials of a multilayered capacitor, $BaTiO_3$ (barium titanate), is a piezoelectric material and a photoelectric material, and recently, it has been mainly used in multilayered capacitors. However, the number of suppliers providing barium titanate powder worldwide is limited, and their manufacturing technology is also restricted.

SUMMARY

In one aspect of the present disclosure, a dielectric layer is formed using a barium titanate base material having a controlled Cl content together with a subcomponent, thereby forming dielectric crystal grains of high crystallinity to provide a multilayered capacitor having improved reliability and withstand voltage characteristics.

A multilayered capacitor according to one aspect includes a capacitor body including a dielectric layer and an internal electrode, and an external electrode disposed outside the capacitor body. The dielectric layer includes a plurality of dielectric crystal grains, the dielectric crystal grains include barium titanate as a main component and $Dy_2O_3$ as a subcomponent, and the barium titanate includes about 0.005 to about 0.065 wt % of Cl.

The barium titanate may include about 0.01 to about 0.065 wt % of Cl.

$Dy_2O_3$ may be included in an amount of about 0.1 to about 3.0 parts by mole based on 100 parts by mole of the main component.

The subcomponent may further include at least one of $MnO_2$, $V_2O_5$, $BaCO_3$, $SiO_2$, $Al_2O_3$, and $ZrO_2$.

About 1.0 to about 3.0 parts by mole of $Dy_2O_3$, about 0 to about 0.3 parts by mole of $MnO_2$, about 0 to about 0.3 parts by mole of $V_2O_5$, about 0 to about 2.0 parts by mole of $BaCO_3$, about 0 to about 1.0 part by mole of $SiO_2$, about 0 to about 0.6 parts by mole of $Al_2O_3$, and about 0 to about 2.0 parts by mole of $ZrO_2$ may be included based on 100 parts by mole of the main component.

About 1.0 to about 2.0 parts by mole of $Dy_2O_3$, about 0.1 to about 0.2 parts by mole of $MnO_2$, about 0.1 to about 0.2 parts by mole of $V_2O_5$, about 0.1 to about 1.5 parts by mole of $BaCO_3$, about 0.1 to about 0.75 parts by mole of $SiO_2$, about 0.1 to about 0.5 parts by mole of $Al_2O_3$, and 0.1 parts by mole to 1.5 parts by mole of $ZrO_2$ may be included based on 100 parts by mole of the main component.

About 1.0 to about 1.5 parts by mole of $ZrO_2$ may be included based on 100 parts by mole of the main component.

The subcomponent may be included in an amount of about 3.0 to about 7.0 parts by mole based on 100 parts by mole of the main component.

The main components may include $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

A method for manufacturing a multilayered capacitor according to another aspect includes preparing a dielectric powder including barium titanate including about 0.005 to about 0.065 wt % of Cl as a main component; mixing about 3.0 to about 7.0 parts by mole of a subcomponent including $Dy_2O_3$ based on 100 parts by mole of the main component to prepare a dielectric green sheet using a mixture of the main component and subcomponent, and forming a conductive paste layer on a surface of the dielectric green sheet; stacking the dielectric green sheets on which the conductive paste layer is formed to manufacture a dielectric green sheet stack; firing the dielectric green sheet stack to manufacture a capacitor body; and forming an external electrode on one surface of the capacitor body.

The subcomponent may further include at least one of $MnO_2$, $V_2O_5$, $BaCO_3$, $SiO_2$, $Al_2O_3$, and $ZrO_2$.

About 0 to about 3.0 parts by mole of $Dy_2O_3$, about 0 to about 0.3 parts by mole of $MnO_2$, about 0 to about 0.3 parts by mole of $V_2O_5$, about 0 to about 2.0 parts by mole of $BaCO_3$, about 0 to about 1.0 part by mole of $SiO_2$, about 0 to about 0.6 parts by mole of $Al_2O_3$, and about 0 to about 2.0 parts by mole of $ZrO_2$ may be included based on 100 parts by mole of the main component.

About 1.0 to about 1.5 parts by mole of $ZrO_2$ may be included based on 100 parts by mole of the main component.

The preparing of the dielectric powder may include preparing a raw material mixture by wet-mixing a barium (Ba) precursor including about 0 to about 0.1 wt % of Cl and a titanium (Ti) precursor including about 0 to about 0.08 wt % of Cl, and calcining the raw material mixture to prepare a dielectric powder.

The preparing of the dielectric powder may further include drying and dry-grinding the raw material mixture.

The preparing of the dielectric powder may further include wet-grinding the dielectric powder, followed by drying and dry-grinding.

The barium (Ba) precursor may include $BaO_2$, $BaTiO_3$, $BaCO_3$, BaO, or a combination thereof.

The titanium (Ti) precursor may include titanium dioxide, titanium diisopropoxide diacetyl acetonate (TPA), titanium alkoxide, or a combination thereof.

The calcining may be performed at about 500° C. to about 1000° C. for about 0.5 hour to about 3 hours under a vacuum or normal pressure atmosphere.

The calcining may include a first calcining at about 600° C. to about 900° C. for about 0.5 hours to about 3 hours and a second calcining at about 700° C. to about 1,000° C. for about 0.5 hours to about 3 hours.

The first calcining and the second calcining may be performed continuously or discontinuously.

The dielectric green sheet may be manufactured by mixing the mixture of the main component and subcomponent with a solvent and an additive to prepare a dielectric slurry, and molding the dielectric slurry into a sheet shape.

In the multilayered capacitor according to one aspect, by forming a dielectric layer using a barium titanate base material having a controlled Cl content together with a subcomponent, high crystalline dielectric grains are formed to improve reliability and withstand voltage characteristics.

DETAILED DESCRIPTION OF THE EMBODIMENTS

Figure 1:
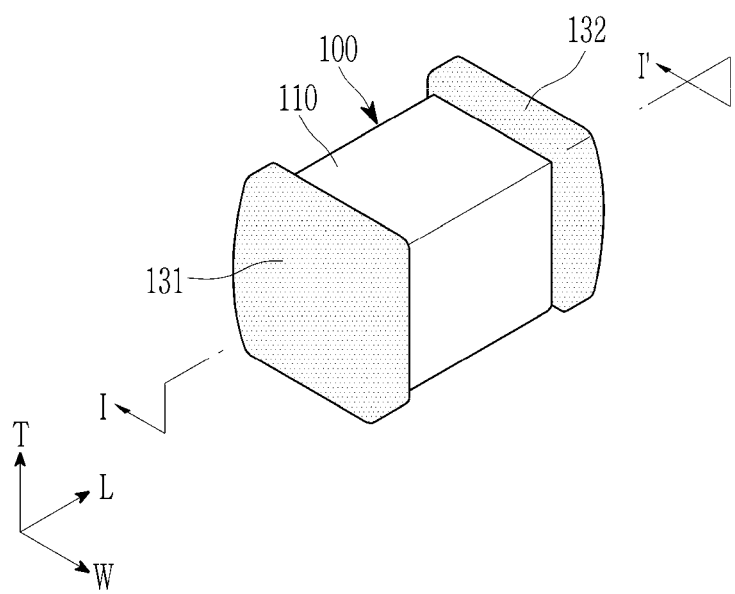
FIG. 1 is a perspective view illustrating a multilayered capacitor according to an embodiment.

The present disclosure will be described more fully hereinafter with reference to the accompanying drawings, in which embodiments of the disclosure are shown. The drawings and description are to be regarded as illustrative in nature and not restrictive. Like reference numerals designate like elements throughout the specification. Further, the accompanying drawings are provided only in order to allow embodiments disclosed in the present specification to be easily understood, and are not to be interpreted as limiting the spirit disclosed in the present specification, and it is to be understood that the present disclosure includes all modifications, equivalents, and substitutions without departing from the scope and spirit of the present disclosure.

Terms including ordinal numbers such as first, second, and the like will be used only to describe various constituent elements, and are not to be interpreted as limiting these constituent elements. The terms are only used to differentiate one constituent element from other constituent elements.

It is to be understood that when one constituent element is referred to as being "connected" or "coupled" to another constituent element, it may be connected or coupled directly to the other constituent element or may be connected or coupled to the other constituent element with a further constituent element intervening therebetween. In contrast, it should be understood that, when it is described that an element is "directly coupled" or "directly connected" to another element, no element is present between the element and the other element.

Throughout the specification, it should be understood that the term "include," "comprise," "have," or "configure" indicates that a feature, a number, a step, an operation, a constituent element, a part, or a combination thereof described in the specification is present, but does not exclude a possibility of presence or addition of one or more other features, numbers, steps, operations, constituent elements, parts, or combinations, in advance. Unless explicitly described to the contrary, the word "comprise" and variations such as "comprises" or "comprising" will be understood to imply the inclusion of stated elements but not the exclusion of any other elements.

Figure 2:
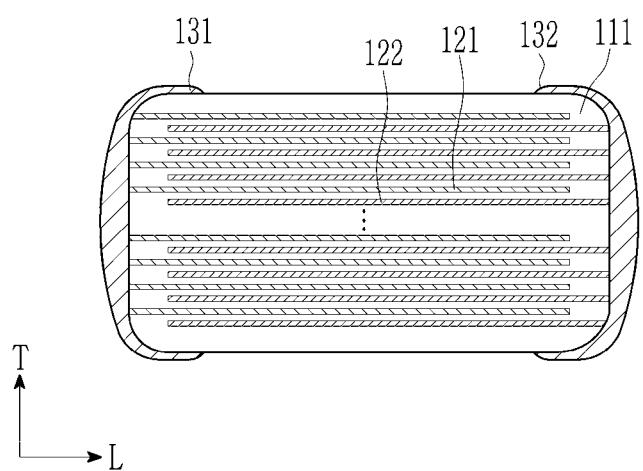
FIG. 2 is a cross-sectional view of the multilayered capacitor taken along line I-I' of FIG. 1.
Figure 3:
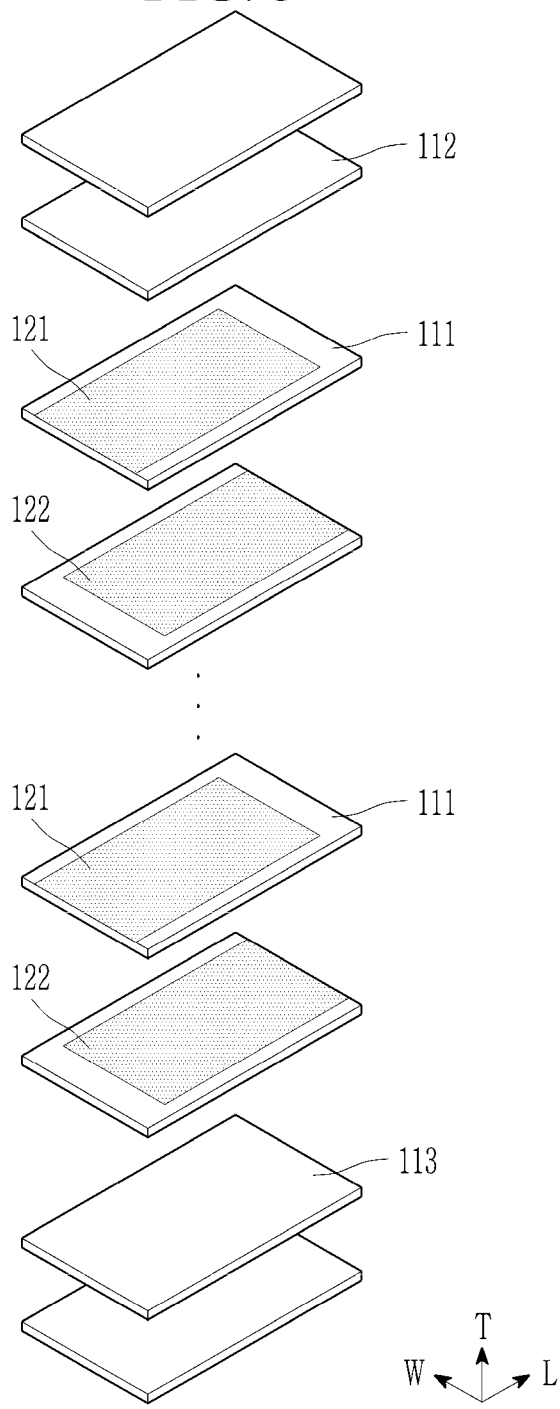
FIG. 3 is an exploded perspective view illustrating a stacked structure of internal electrodes in the capacitor body of FIG. 1.

FIG. 1 is a perspective view illustrating a multilayered capacitor 100 according to an embodiment, FIG. 2 is a cross-sectional view of the multilayered capacitor 100 taken along line I-I' of FIG. 1, and FIG. 3 is an exploded perspective view illustrating a stacked structure of internal electrodes in the capacitor body 110 of FIG. 1.

When directions are defined to clearly describe the present embodiment, the L-axis, W-axis, and T-axis indicated in the drawings represent the longitudinal direction, the width direction, and the thickness direction of the capacitor body 110, respectively. Herein, the thickness direction (T-axis direction) may be a direction perpendicular to the wide surface (main surface) of the sheet-shaped components, and may be, for example, used in the same concept as the stacking direction in which the dielectric layers 111 are stacked. The longitudinal direction (L-axis direction) may be a direction substantially perpendicular to the thickness direction (T-axis direction) in a direction extending parallel to the wide surface (main surface) of the sheet-shaped components, and may be, for example, a direction in which the first and second external electrodes 131 and 132 are disposed. The width direction (W-axis direction) may be a direction that extends parallel to the wide surface (main surface) of the sheet-shaped components and is substantially perpendicular to the thickness direction (T-axis direction), and the length of the sheet-like components in the longitudinal direction (L-axis direction) may be longer than the length in the width direction (W-axis direction).

Referring to FIGS. 1 to 3, the multilayered capacitor 100 according to the present embodiment may include the capacitor body 110, and first and second external electrodes 131 and 132 disposed at both ends of the capacitor body 110 which face each other in the longitudinal direction (L-axis direction).

The capacitor body 110 may have, for example, a substantially hexahedral shape.

In this embodiment, for convenience of explanation, in the capacitor body 110, surfaces opposite to each other in the thickness direction (T-axis direction) are defined as first and second surfaces, surfaces connected to the first and second surfaces and facing each other in the longitudinal direction (L-axis direction) are defined as third and fourth surfaces, and surfaces connected to the first and second surfaces, connected to the third and fourth surfaces, and facing each other in the width direction (W-axis direction) are defined as fifth and sixth surfaces.

For example, the first surface, which is a lower surface, may be a surface facing a mounting direction. In addition, the first to sixth surfaces may be flat, but the present embodiment is not limited thereto, for example, the first to sixth surfaces may be curved surfaces with a convex central portion, and an edge of each surface which is a boundary, may be round.

The shape and dimensions of the capacitor body 110 and the number of stacked dielectric layers 111 are not limited to those shown in the drawings of the present embodiment.

The capacitor body 110 is formed by stacking a plurality of the dielectric layers 111 in the thickness direction (T-axis direction) and then firing them, and includes a plurality of dielectric layers 111, and first and second internal electrodes 121 and 122 which are alternately disposed in a thickness direction (T-axis direction) with the dielectric layers 111 interposed therebetween.

Herein, the boundary between the respective dielectric layers 111 adjacent to each other of the capacitor body 110 may be integrated to the extent that it is difficult to check without using a scanning electron microscope (SEM).

Also, the capacitor body 110 may include an active region and cover regions 112 and 113.

The active region contributes to generating a capacitance of the multilayered capacitor 100. For example, the active region may be a region in which the first and second internal electrodes 121 and 122 are stacked and overlapped with each other along the thickness direction (T-axis direction).

The cover regions 112 and 113 may be respectively disposed on the first and the second surfaces of the active region in the thickness direction (T-axis direction) as thickness-direction margin portions. The cover regions 112 and 113 may be formed by stacking a single dielectric layer 111 or two or more dielectric layers 111 on an upper surface and a lower surface of the active region, respectively.

In addition, the capacitor body 110 may further include a side cover region. The side cover region is a width-direction margin portion, and may be respectively disposed on the fifth and sixth surfaces of the active region in the width direction (W-axis direction). Such a side cover region may be formed by coating a conductive paste layer for an internal electrode only on a portion of the surface of the dielectric green sheet, stacking dielectric green sheets on which a conductive paste layer is not coated on both side surfaces of the dielectric green sheet, and firing the same.

The cover regions 112 and 113 and the side cover regions serve to prevent damage to the first and second internal electrodes 121 and 122 due to physical or chemical stress.

The dielectric layer 111 includes a plurality of dielectric crystal grains.

The dielectric crystal grains include barium titanate as a main component and $Dy_2O_3$ as a subcomponent, and the barium titanate includes about 0.005 to about 0.065 wt % of Cl. When barium titanate including about 0.005 to about 0.065 wt % of Cl is included as a dielectric base material as a main component, crystallinity is improved to have a high dielectric constant, which can contribute to forming the dielectric constant of the multilayered capacitor 100. In one example, the term "about" may refer to a concept including a minute difference caused by a process error. For example, "about a value" may include not only a case of being "the value", but also a case of having a minute difference caused by a process error or a measurement, recognizable by one of ordinary skill in the art.

In addition, by including $Dy_2O_3$ as a subcomponent, reliability, particularly high-temperature reliability, may be improved.

For example, the barium titanate may include about 0.01 to about 0.065 wt % of Cl.

For example, about 0.1 to about 3.0 parts by mole of $Dy_2O_3$ may be included based on 100 parts by mole of the main component.

The subcomponent may further include at least one of $MnO_2$, $V_2O_5$, $BaCO_3$, $SiO_2$, $Al_2O_3$, and $ZrO_2$.

As a specific example, about 1.0 to about 3.0 parts by mole of $Dy_2O_3$, about 0 to about 0.3 parts by mole of $MnO_2$, about 0 to about 0.3 parts by mole of $V_2O_5$, about 0 to about 2.0 parts by mole of $BaCO_3$, about 0 to about 1.0 part by mole of $SiO_2$, about 0 to about 0.6 parts by mole of $Al_2O_3$, and about 0 to about 2.0 parts by mole of $ZrO_2$ may be included based on 100 parts by mole of the main component.

For example, about 1.0 to about 3.0 parts by mole of $Dy_2O_3$, about 0 to about 0.3 parts by mole of $MnO_2$, about 0 to about 0.3 parts by mole of $V_2O_5$, about 0 to about 2.0 parts by mole of $BaCO_3$, about 0 to about 1.0 part by mole of $SiO_2$, about 0 to about 0.6 parts by mole of $Al_2O_3$, and about 0 to about 2.0 parts by mole of $ZrO_2$ may be included based on 100 parts by mole of the main component.

For example, about 1.0 to about 1.5 parts by mole of $ZrO_2$ may be included based on 100 parts by mole of the main component.

When 1.0 to 1.5 parts by mole of $ZrO_2$ is included as a subcomponent, high-temperature reliability may be further improved.

In an embodiment, about 1.0 to about 2.0 parts by mole of $Dy_2O_3$, about 0.1 to about 0.2 parts by mole of $MnO_2$, about 0.1 to about 0.2 parts by mole of $V_2O_5$, about 0.1 to about 1.5 parts by mole of $BaCO_3$, about 0.1 to about 0.75 parts by mole of $SiO_2$, about 0.1 to about 0.5 parts by mole of $Al_2O_3$, and 0.1 parts by mole to 1.5 parts by mole of $ZrO_2$ may be included based on 100 parts by mole of the main component.

The subcomponent may be included in an amount of about 3.0 to about 7.0 molar parts based on 100 parts by mole of the main component.

For example, the main components may include $BaTiO_3$, Ba(Ti, Zr)$O_3$, Ba(Ti, Sn)$O_3$, (Ba, Ca)TiO$_3$, (Ba, Ca)(Ti, Zr)$O_3$, (Ba, Ca)(Ti, Sn)$O_3$, (Ba, Sr)TiO$_3$, (Ba, Sr)(Ti, Zr)$O_3$, (Ba, Sr)(Ti, Sn)$O_3$, or a combination thereof.

A cross-sectional sample of the capacitor body 110 may be, for example, prepared as follows: after the multilayered capacitor 100 is placed in an epoxy mixture and cured, and then the L-axis and T-axis sides of the capacitor body 110 are polished to ½ points in the W-axis direction followed by fixing and maintaining in a vacuum atmosphere chamber.

The scanning electron microscope is, for example, a Verios G4 product from Thermo Fisher Scientific, and measurement conditions may be about 10 KV and about 0.2 nA.

A component of a specific element (e.g., Cl) in the center of a dielectric crystal grain may be measured using HP-IC, for example, high pressure ion chromatography (HP-IC). At this time, as the measuring equipment, Thermo Fisher Scientific's ICS 5000 product may be used. For example, the prepared capacitor dielectric layer is taken out and mixed with DI water, and an eluate is obtained through filtering, a content of an element (e.g., Cl) is measured 3 times to obtain an average value, and another capacitor dielectric layer is taken out and a content of an element (e.g., Cl) is measured 10 times. Based on the results, the average value of the minimum and maximum values can be taken as the final specific element content.

The first and second internal electrodes 121 and 122 are electrodes having different polarities, and are alternately disposed to face each other along the T-axis direction with the dielectric layer 111 interposed therebetween, and one end thereof may be exposed through (or extend from or be in contact with) the third or fourth surfaces of the capacitor body 110.

The first and second internal electrodes 121 and 122 may be electrically insulated from each other by the dielectric layer 111 disposed therebetween.

Ends of the first and second internal electrodes 121 and 122 alternately exposed through the third and fourth surfaces of the capacitor body 110 are connected to the first and second external electrodes 131 and 132, respectively, to be electrically connected.

The first and second internal electrodes 121 and 122 may include a conductive metal, for example, a metal such as Ni, Cu, Ag, Pd, or Au, and the like, an alloy thereof, for example a Ag—Pd alloy.

Also, the first and second internal electrodes 121 and 122 may include dielectric particles having the same composition as the ceramic material included in the dielectric layer 111.

The first and second internal electrodes 121 and 122 may be formed using a conductive paste containing a conductive metal. As a method of printing the conductive paste, a screen-printing method or a gravure printing method or the like may be used.

For example, each average thickness of the first and second internal electrodes 121 and 122 may be about 0.1 μm to about 2 μm.

The first and second external electrodes 131 and 132 are supplied with voltages of different polarities, and are electrically connected to exposed portions of the first and second internal electrodes 121 and 122, respectively.

According to the above configuration, when a predetermined voltage is applied to the first and second external electrodes 131 and 132, charges are accumulated between the first and second internal electrodes 121 and 122. At this time, a capacitance of the multilayered capacitor 100 is proportional to an overlapping area of the first and second internal electrodes 121 and 122 overlapping with each other along the T-axis direction in the active region.

The first and second external electrodes 131 and 132 may respectively include first and second connection portions disposed on the third and fourth surfaces of the capacitor body 110 and connected to the first and second internal electrodes 121 and 122, and may also include first and second band portions disposed at each corner where the third and fourth surfaces of the capacitor body 110 and the first and second surfaces or fifth and sixth surfaces thereof meet.

The first and second band portions may extend from the first and second connection portions to portions of the first and second surfaces or the fifth and sixth surfaces of the capacitor body 110, respectively. The first and second band portions may serve to improve the bonding strength of the first and the second external electrodes 131 and 132.

For example, the first and the second external electrodes 131 and 132 are disposed to cover a sintered metal layer contacting the capacitor body 110, a conductive resin layer configured to cover the sintered metal layer, and a plating layer configured to cover a conductive resin layer, respectively.

The sintered metal layer may include a conductive metal and glass.

For example, the sintered metal layers may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, as a conductive metal, and for example, the copper (Cu) may be in a form of a copper (Cu) alloy. When the conductive metal includes copper, a metal other than copper may be included in an amount of less than or equal to about 5 parts by mole based on 100 parts by mole of copper.

For example, the sintered metal layer may include a composition of oxides as a glass, for example, one or more selected from a silicon oxide, a boron oxide, an aluminum oxide, a transition metal oxide, an alkali metal oxide, and an alkaline earth metal oxide. The transition metal may be selected from zinc (Zn), titanium (Ti), copper (Cu), vanadium (V), manganese (Mn), iron (Fe), and nickel (Ni); the alkali metal may be selected from lithium (Li), sodium (Na), and potassium (K); and the alkaline-earth metal may be selected from magnesium (Mg), calcium (Ca), strontium (Sr), and barium (Ba).

A content of the conductive metal and glass in the sintered metal layer is not particularly limited, but, for example, an average area of the conductive metal in the cross section perpendicular to the thickness direction (W-axis direction) of the multilayered capacitor 100 (L-axis and T-axis cross-sections) may be about 30% to about 90% or about 70% to about 90% of the total area of the sintered metal layer.

Optionally, the conductive resin layer is formed on the sintered metal layer, and for example, may be formed to completely cover the sintered metal layer. Meanwhile, the first and second external electrodes 131 and 132 may not include a sintered metal layer, and in this case, the conductive resin layer may directly contact the capacitor body 110.

The conductive resin layer extends to the first and second surfaces or the fifth and sixth surfaces of the capacitor body 110, and a length of the region (i.e., the band portion) where the conductive resin layer extends to the first and second surfaces or the fifth and sixth surfaces of the capacitor body 110 may be longer than a length of the region (i.e., the band portion) where the sintered metal layer extends to the first and second surfaces or the fifth and sixth surfaces of the capacitor body 110. That is, the conductive resin layer may be formed on the sintered metal layer and completely cover the sintered metal layer.

The conductive resin layer includes a resin and a conductive metal.

The resin included in the conductive resin layer is not particularly limited as long as it has bondability and impact absorption properties and can be mixed with the conductive metal powder to form a paste, and may include, for example, a phenolic resin, an acrylic resin, a silicone resin, an epoxy resin, or a polyimide resin.

The conductive metal included in the conductive resin layer serves to electrically connect the first and second internal electrodes 121 and 122 or the sintered metal layer.

The conductive metal included in the conductive resin layer may have a spherical shape, a flake shape, or a combination thereof. That is, the conductive metal may be formed only in a flake shape, only in a spherical shape, or may have a mixed shape of a flake shape and a spherical shape.

Herein, the spherical shape may also include a shape that is not perfectly spherical, and may include a shape in which, for example, a length ratio between a major axis and a minor axis (long axis/short axis) is less than or equal to about 1.45. The flake-shaped powder means a powder having a flat and elongated shape, and is not particularly limited, but, for example, a length ratio between a major axis and a minor axis (long axis/short axis) may be greater than or equal to about 1.95.

The first and second external electrodes 131 and 132 may further include plating layer outside the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb), alone or an alloy thereof. For example, the plating layer may be a nickel (Ni) plating layer or a tin (Sn) plating layer, and may have a form in which a nickel (Ni) plating layer and a tin (Sn) plating layer are sequentially stacked or a tin (Sn) plating layer, a nickel (Ni) plating layer, and a tin (Sn) plating layer are sequentially stacked. In addition, the plating layer may include a plurality of nickel (Ni) plating layers and/or a plurality of tin (Sn) plating layers.

The plating layer may improve mountability of the multilayered capacitor 100 with a board, structural reliability, external durability, heat resistance, and equivalent series resistance (ESR).

A method for manufacturing a multilayered capacitor according to another embodiment includes preparing a dielectric powder including barium titanate including about 0.005 to about 0.065 wt % of Cl as a main component; mixing about 3.0 to about 7.0 parts by mole of a subcomponent including $Dy_2O_3$ based on 100 parts by mole of the main component to prepare a dielectric green sheet using a mixture of the main component and subcomponent, and forming a conductive paste layer on the surface of the dielectric green sheet; stacking the dielectric green sheets on which the conductive paste layer is formed to manufacture a dielectric green sheet stack; firing the dielectric green sheet stack to manufacture a capacitor body; and forming an external electrode on one surface of the capacitor body.

Figure 7:
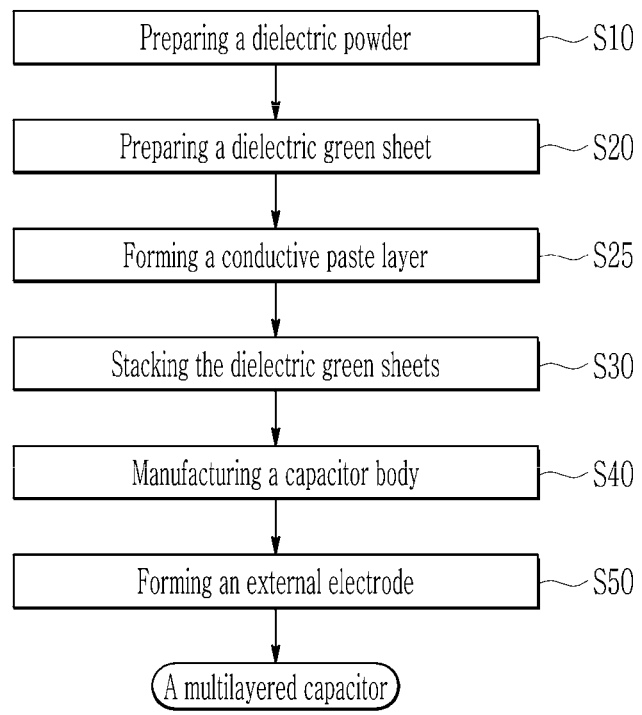
FIG. 7 is a process flow chart illustrating a method of manufacturing a multilayered capacitor according to an embodiment.
Figure 8:
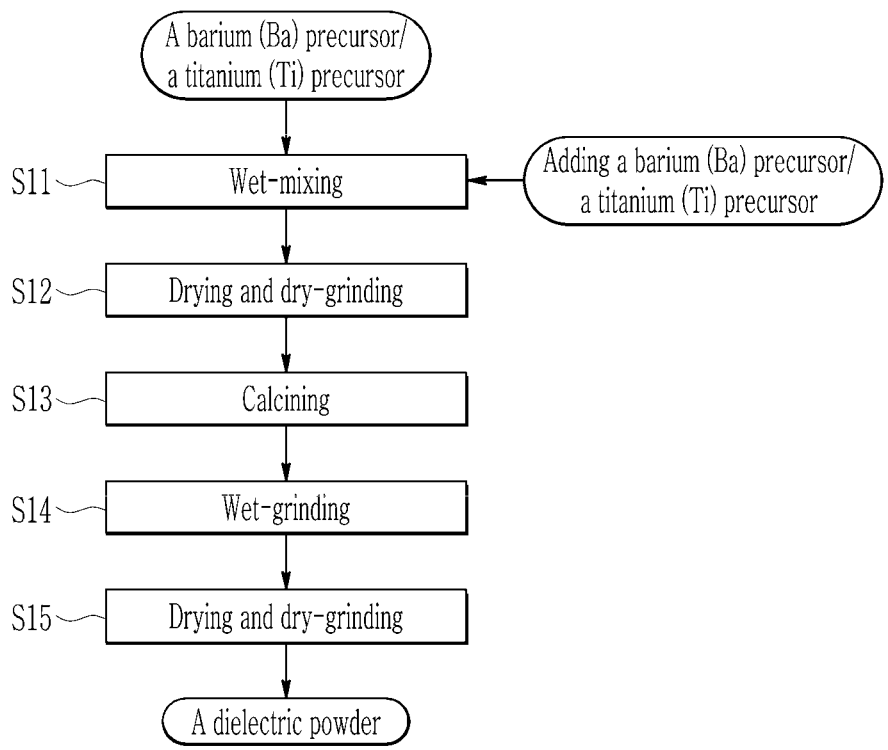
FIG. 8 is a process flow chart illustrating a manufacturing step of dielectric powder in a method of manufacturing a multilayered capacitor.

FIG. 7 is a process flow chart illustrating a method of manufacturing a multilayered capacitor according to an embodiment and FIG. 8 is a process flow chart illustrating a manufacturing step of dielectric powder in a method of manufacturing a multilayered capacitor. Hereinafter, a method of manufacturing a multilayered capacitor will be described in detail with reference to FIGS. 7 and 8.

First, a method for preparing dielectric powder will be described (S10).

A raw material mixture is prepared by wet-mixing a barium (Ba) precursor including about 0 to about 0.1 wt % of Cl and a titanium (Ti) precursor including about 0 to about 0.08 wt % of Cl. Through this, barium titanate powder having a controlled Cl content may be prepared, and by forming a dielectric layer using the same, high-crystallinity and highly dielectric crystal grains may be formed, thereby improving reliability and withstand voltage characteristics.

For example, the barium precursor may include about 0.001 to about 0.1 wt % of Cl.

As a specific example, the barium precursor may include about 0.001 to about 0.09 wt % of Cl.

The barium (Ba) precursor may include $BaO_2$, $BaTiO_3$, $BaCO_3$, BaO, or a combination thereof.

For example, the titanium precursor may include about 0.0001 to about 0.08 wt % of Cl.

As a specific example, the titanium precursor may include about 0.0001 to about 0.076 wt % of Cl.

The titanium (Ti) precursor may include titanium dioxide, titanium diisopropoxide diacetyl acetonate (TPA), titanium alkoxide, or a combination thereof.

In this case, when the dielectric powder further includes additional elements such as Ca, Sr, Sn, or Zr, precursors of these additional elements may be further added together with a barium (Ba) precursor and a titanium (Ti) precursor. As an example, the precursors of the additional elements may be compounds such as oxides or carbonates including these additional elements.

The wet-mixing may be carried out by using a disperser such as a bead mill or a ball mill, or by performing a high-pressure dispersion treatment to disperse the mixture in a wet manner together with a solvent. For example, in the case of dispersing using a bead mill, beads having a diameter of about 0.03 mm to about 0.1 mm may be used for dispersion treatment in about 5 to about 30 passes at a peripheral speed of about 5 m/s to about 15 m/s.

As the solvent used for wet-mixing, for example, an aqueous solvent such as ion-exchanged water, pure water, ultrapure water, or distilled water may be used, or an alcohol-based solvent, an amine-based solvent such as ammonia, or organic amine may be used together with water.

Optionally, a dispersant may be further added in the raw material mixing step, and may be, for example, a polyvinylbutyl-based dispersant, a polyvinyl acetal-based dispersant, a polycarboxylic acid-based dispersant, a maleic acid-based dispersant, a polyethylene glycol-based dispersant, an allyl ether copolymer-based dispersant, and the like.

Optionally, the raw material mixture may be subjected to drying and dry-grinding (S12).

Next, the raw material mixture is subjected to calcination to prepare a dielectric powder (S13).

The calcination may be performed at about 500° C. to about 1000° C. for about 0.5 hour to about 3 hours under a vacuum or normal pressure atmosphere.

The calcination may include a first calcination at about 600° C. to about 900° C. for about 0.5 hours to about 3 hours and a second calcination at about 700° C. to about 1,000° C. for about 0.5 hours to about 3 hours.

The first calcination and the second calcination may be performed continuously or discontinuously.

The vacuum atmosphere may be, for example, a vacuum atmosphere of about 20000 Pa or less, or about 100 Pa or less.

If the calcination temperature is less than about 500° C. or the calcination time is less than about 0.5 hours, there may be a problem with the powder compatibility, and if the calcination temperature exceeds about 1000° C. or the calcination time exceeds about 3 hours, grain growth may be excessive and there may be problems with powder distribution.

Optionally, after wet-grinding the dielectric powder (S14), drying and dry-grinding may be performed (S15).

Next, manufacture of the capacitor body will be described.

In the manufacturing process of the capacitor body, a dielectric slurry to become a dielectric layer after firing and a conductive paste to become internal electrodes after firing are prepared.

The dielectric slurry is prepared, for example, by the following method.

A mixed powder of the main component and the subcomponent is prepared by mixing the main component powder and the subcomponent powder, which are the prepared dielectric powders.

The subcomponent may further include at least one of $MnO_2$, $V_2O_5$, $BaCO_3$, $SiO_2$, $Al_2O_3$, and $ZrO_2$.

For example, about 0 to about 3.0 parts by mole of $Dy_2O_3$, about 0 to about 0.3 parts by mole of $MnO_2$, about 0 to about 0.3 parts by mole of $V_2O_5$, about 0 to about 2.0 parts by mole of $BaCO_3$, about 0 to about 1.0 part by mole of $SiO_2$, about 0 to about 0.6 parts by mole of $Al_2O_3$, and about 0 to about 2.0 parts by mole of $ZrO_2$ may be included based on 100 parts by mole of the main component.

For example, about 1.0 to about 1.5 parts by mole of $ZrO_2$ may be included based on 100 parts by mole of the main component.

The mixed powder of the main component and the subcomponent is mixed with a solvent and an additive to prepare a dielectric slurry.

The additive may be, for example, a dispersant, a binder, or a plasticizer, and may further include other additives such as a lubricant and an antistatic agent.

The dispersant may be, for example, a phosphoric acid ester-based dispersant or a polycarboxylic acid-based dispersant. A content of the dispersant may be about 0.1 part by weight to about 5 parts by weight, or about 0.3 part by weight to about 3 parts by weight based on 100 parts by weight of the mixed powder of the main component and the subcomponent. When the content of the dispersant is about 0.1 part by weight to about 5 parts by weight, a sufficient effect as a dispersant may be exerted, and impurities included in the manufactured dielectric layer may be reduced.

The binder may be, for example, an acrylic resin, a polyvinylbutyl resin, a polyvinyl acetal resin, or an ethylcellulose resin. A content of the binder may be about 0.1 part by weight to about 50 parts by weight, or about 3 parts by weight to about 30 parts by weight based on 100 parts by weight of the mixed powder of the main component and the subcomponent. When the content of the binder is about 0.1 part by weight to about 50 parts by weight, a sufficient effect as a binder may be exhibited, and impurities included in the manufactured dielectric layer may be reduced.

The plasticizer may be, for example, a phthalic acid-based plasticizer such as dioctyl phthalate, benzyl butyl phthalate, dibutyl phthalate, dihexyl phthalate, di(2-ethylhexyl) phthalate (DOP), or di(2-ethyl butyl) phthalate, an adipic acid-based plasticizer such as dihexyl adipate or di(2-ethylhexyl) adipate (DOA), a glycol plasticizer such as ethylene glycol, diethylene glycol, or triethylene glycol, a triethylene glycol ester-based plasticizer such as triethylene glycol dibutyrate, glycol di(2-ethyl butylate), or triethylene glycol di(2-ethylhexanoate); and the like. A content of the plasticizer may be about 0.1 part by weight to about 20 parts by weight, or about 1 part by weight to about 10 parts by weight based on 100 parts by weight of the mixed powder of the main component and the subcomponent. When the content of the plasticizer is about 0.1 part by weight to about 20 parts by weight, a sufficient effect as a plasticizer may be exerted, and impurities included in the manufactured dielectric layer may be reduced.

Examples of the solvent may include an aqueous solvent such as water, an alcohol solvent such as ethanol, methanol, benzyl alcohol, and methoxyethanol, a glycol solvent such as ethylene glycol and diethylene glycol, a ketone-based solvent such as acetone, methyl ethyl ketone, methyl isobutyl ketone, or cyclohexanone, an ester-based solvent such as butyl acetate, ethyl acetate, carbitol acetate, or butyl carbitol acetate, an ether-based solvent such as methyl cellosolve, ethyl cellosolve, butyl ether, or tetrahydrofuran, an aromatic solvent such as benzene, toluene, or xylene. Considering solubility and dispersibility of various additives included in the dielectric slurry, an alcohol solvent or an aromatic solvent may be used as the solvent. The amount of the solvent may be about 50 parts by weight to about 1000 parts by weight, or about 100 parts by weight to about 500 parts by weight based on 100 parts by weight of the mixed powder of the main component and the subcomponent. When the content of the solvent is about 50 parts by weight to about 1000 parts by weight, the main component, subcomponent, and additives may be sufficiently mixed, and the solvent may be easily removed in the subsequent process.

A wet ball mill or a stirring mill may be used to mix the main component and the subcomponent. In the case of using zirconia balls in a wet ball mill, wet-mixing may be performed for about 8 hours to about 48 hours, or about 10 hours or about 24 hours using a plurality of zirconia balls having a diameter of about 0.1 mm to about 10 mm.

Next, the dielectric slurry is molded into a sheet shape (S20).

A method of forming the dielectric slurry into a sheet shape may use a tape forming method such as a doctor blade method or a calender roll method, for example, an on-roll forming coater of a head discharge method, and a dielectric green sheet can be obtained by drying the molded body.

Conductive paste for the internal electrode is prepared by kneading conductive powder made of a conductive metal or an alloy thereof with a binder or a solvent. The conductive paste for the internal electrode may include ceramic powder (for example, barium titanate powder) as a co-material, if necessary. The co-material may act to suppress sintering of the conductive powder during the firing process.

On the surface of the dielectric green sheet, the conductive paste for an internal electrode is coated in a predetermined pattern by various printing methods such as screen printing or a transfer method (S25). After stacking a plurality of layers of dielectric green sheets on which internal electrode patterns are formed, a dielectric green sheet stack is obtained by pressing in the stacking direction (S30). At this time, the dielectric green sheets and internal electrode patterns may be stacked so that the dielectric green sheets may be disposed on the upper and lower surfaces of the dielectric green sheet stack in the stacking direction.

Optionally, the obtained dielectric green sheet stack may be cut into predetermined dimensions by dicing or the like.

In addition, the dielectric green sheet stack may be solidified and dried to remove the plasticizer, etc. and barrel-polished by using a centrifugal barrel machine or the like after the solidification-drying. In the barrel polishing, the dielectric green sheet stack is put with a medium and a polishing liquid into a barrel container, and then the barrel container is applied with rotational motion or vibration to polish unnecessary parts such as burrs and the like generated during the cutting. In addition, after the barrel polishing, the dielectric green sheet stack is washed with a cleaning solution such as water and the like and dried.

The dielectric green sheet stack is treated to remove the binder and fired, obtaining the capacitor body (S40).

The binder removal may be performed under conditions appropriately adjusted according to a main component composition of the dielectric layer or a main component composition of the internal electrode. For example, the binder removal may be performed by increasing a temperature at about 5° C./hr to about 300° C./hr and maintaining about 180° C. to about 400° C. for about 0.5 hours to about 24 hours. The binder removal may be performed under an air atmosphere or a reducing atmosphere.

The firing treatment may be performed under conditions appropriately adjusted according to the main component composition of the dielectric layer or the main component composition of the internal electrode. For example, the firing may be performed at about 1200° C. to about 1350° C. or about 1220° C. to about 1300° C. for about 0.5 hours to about 8 hours or about 1 hour to about 3 hours. The firing may be performed under a reducing atmosphere, for example, an atmosphere in which a mixed gas of nitrogen gas ($N_2$) and hydrogen gas ($H_2$) is humidified. When the internal electrode includes nickel (Ni) or a nickel (Ni) alloy, an oxygen partial pressure may be about $1.0 \times 10^{-14}$ MPa to about $1.0 \times 10^{-10}$ MPa under the firing atmosphere.

After the firing treatment, annealing may be performed, if needed. The annealing is performed for re-oxidizing the dielectric layer, and when the firing is performed under a reducing atmosphere, the annealing may be performed. The annealing may be performed under conditions appropriately adjusted according to the main component composition and the like of the dielectric layer. For example, the annealing may be performed at about 950° C. to about 1150° C. for about 0 hour to about 20 hours by increasing the temperature at about 50° C./hour to about 500° C./hour. The annealing may be performed under a humid nitrogen gas ($N_2$) atmosphere, wherein an oxygen partial pressure may be about $1.0 \times 10^{-9}$ MPa to about $1.0 \times 10^{-5}$ MPa.

In the binder removal treatment, the firing treatment, or the annealing treatment, in order to humidify nitrogen gas, mixed gas, or the like, a wetter or the like may be for example, used, wherein a water temperature may be about 5° C. to about 75° C. The binder removal treatment, the firing treatment, and the annealing treatment may be performed continuously or independently.

Optionally, the third and fourth surfaces of the obtained capacitor body may be surface-treated through sandblasting, laser irradiation, barrel polishing, or the like. This surface treatment may expose the ends of the first and second internal electrodes on the outer surfaces of the third and fourth surfaces, thereby improving the electrical connection of the first and second external electrodes and first and second internal electrodes and easily forming the alloy portion.

An external electrode is formed on the outer surface of the capacitor body (S50).

For example, as an external electrode, a sintered metal layer may be formed by coating a paste for forming a sintered metal layer and then sintering the paste.

The paste for forming the sintered metal layer may include a conductive metal and glass. The conductive metal and the glass are the same as described above and will not be repeated illustrated again. In addition, the paste for forming the sintered metal layer may optionally include a subcomponent such as a binder, a solvent, a dispersant, a plasticizer, or oxide powder. For example, the binder may include ethyl cellulose, acryl, butyral, or the like, and the solvent may use an organic solvent such as terpineol, butyl carbitol, alcohol, methylethylketone, acetone, or toluene, or an aqueous solvent.

A method of coating the paste for forming the sintered metal layer on the outer surface of the capacitor body may include various printing methods such as a dip method, or screen printing, a coating method by using a dispenser, a spray method by using a spray, and the like. The paste for the sintered metal layer may be coated on at least the third and fourth surfaces of the capacitor body, and optionally, on a portion of the first surface, the second surface, the fifth surface, or the sixth surface where the band portions of the first and second external electrodes are formed Subsequently, the capacitor body on which the paste for forming the sintered metal layer is coated is dried and then sintered at a temperature of about 700° C. to about 1000° C. for about 0.1 hour to about 3 hours to form a sintered metal layer.

Optionally, on the outer surface of the obtained capacitor body, a paste for forming a conductive resin layer is coated and cured to form a conductive resin layer.

The paste for forming the conductive resin layer may include a resin and optionally, a conductive metal or a non-conductive filler. The conductive metal and the resin are the same as described above and will not be repeated illustrated again. In addition, the paste for forming the conductive resin layer may optionally include a subcomponent such as a binder, a solvent, a dispersant, a plasticizer, or an oxide powder. For example, the binder may include ethyl cellulose, acryl, butyral, or the like, and the solvent may include an organic solvent such as terpineol, butyl carbitol, alcohol, methylethylketone, acetone, or toluene, or an aqueous solvent.

For example, a method of forming the conductive resin layer may include dipping the capacitor body 110 into the paste for forming the conductive resin layer to form the conductive resin layer and curing it, screen-printing or gravure-printing the paste for forming the conductive resin layer on the surface of the capacitor body 110, or coating the paste for forming the conductive resin layer on the surface of the capacitor body 110 and then curing it.

Next, a plating layer is formed on the outside of the conductive resin layer.

For example, the plating layer may be formed by a plating method, or may be formed by sputtering or electroplating (electric deposition).

Hereinafter, specific embodiments of the invention are presented. However, the examples described below are only for specifically illustrating or explaining the invention, and the scope of the invention is not limited thereto.

Preparation Examples

Production Examples: Preparation of Dielectric Powders BT1 to BT5

$BaCO_3$ powder as a barium (Ba) precursor and $TiO_2$ powder as a titanium (Ti) precursor are prepared, and the $BaCO_3$ powder and $TiO_2$ powder are weighed to have a weight ratio of 71.2:28.8. The weighed $BaCO_3$ powder and $TiO_2$ powder are placed in a weighing tank, water and a dispersant are added, and wet-mixed with a mixer while dispersed with a bead mill to prepare a raw material mixture.

The prepared raw material mixture is dried and the agglomerated raw material mixture is dry-ground.

The raw material mixture is subjected to calcination at 500 to 1000° C. for 0.5 to 3 hours under a vacuum atmosphere or atmospheric pressure to prepare a dielectric powder. In the case of 2-step calcination, the first calcination is performed at 600 to 900° C. for 0.5 to 3 hours, and the second calcination is performed at 700 to 1000° C. for 0.5 to 3 hours continuously or individually to prepare dielectric powder.

After calcination, the agglomerated dielectric powder is wet-ground, and then the dried and agglomerated raw material mixture is dry-ground to obtain a dielectric powder.

The Cl content contained in the BaCO$_3$ powder and TiO$_2$ powder used in the production of the dielectric powders BT1 to BT5, and BET characteristics of the BaCO$_3$ powder and TiO$_2$ powder are shown in Table 1.

In addition, the calcination conditions, BET characteristics, Cl content, and dielectric characteristics of the prepared dielectric powders BT1 to BT5 are shown in Tables 2 and 3.

The calcination conditions and k-factors shown in Table 2 are expressed as relative values based on BT4 values.

TABLE 1

| | | BT 1 | BT2 | BT3 | BT4 | BT5 |
|---|---|---|---|---|---|---|
| BET (m$^2$/g) | BaCO$_3$ | 10-15 | 10-15 | 10-15 | 10-15 | 10-15 |
| | TiO$_2$ | 20-25 | 20-25 | 20-25 | 20-25 | 20-25 |
| Cl (wt %) | in BaCO$_3$ | 0.0675-0.0875 | 0.0675-0.0875 | 0.0095-0.0215 | 0.001-0.005 | 0.001-0.005 |
| | in TiO$_2$ | 0.0276-0.0436 | 0.0001-0.001 | 0.0276-0.0436 | 0.0618-0.0758 | 0.0001-0.001 |

TABLE 2

| Cal. NO | Cal. Temp. | BET (m$^2$/g) | Cl (wt %) in Ba | Cl (wt %) in Ti | Cl (wt %) in BaTiO$_3$ | k-factor | c/a |
|---|---|---|---|---|---|---|---|
| BT 1 | 20° C. ↓ | 4-5 | 0.0479-0.0621 | 0.0079-0.0126 | 0.0559-0.0747 | 8.9% ↓ | ≥1.0100 |
| BT 2 | 20° C. ↓ | 4-5 | 0.0479-0.0621 | 0-0.0003 | 0.025-0.063 | equivalent | ≥1.0100 |
| BT 3 | 5° C. ↓ | 4-5 | 0.0067-0.0153 | 0.0079-0.0126 | 0.013-0.029 | equivalent | ≥1.0100 |
| BT 4 | 960° C. | 4-5 | 0.0007-0.0036 | 0.0178-0.0218 | 0.015-0.025 | 7.31 | ≥1.0100 |
| BT 5 | 15° C. ↑ | 4-5 | 0.0007-0.0036 | 0-0.0003 | 0.0007-0.0038 | 16.2% ↓ | ≥1.0100 |

The specific surface areas, BET (Brunauer, Emmett, Teller) are obtained by preparing 0.5 g of the BT1 to BT5 powders using HM-1220 (Mountech Co.) equipment, by heat-treating at 250° C. for 1 hour using He/N$_2$ mixed gas, and then measuring twice for 5 minutes at 250° C. and under N$_2$ atmosphere and calculating an average value. The k-factor and c/a as indicators for evaluating the crystallinity of barium titanate using XRD (X-ray diffraction) are measured by preparing 0.5 to 1 g of BT1 to BT5 powders using SmartLab (Rigaku) equipment to obtain plat samples on a glass holder, and then measuring under the conditions of XRD power (20 kV, 10 mA), scan width (0.02)°, scan rate (10° C./min), and scan range (20 to 100)°. It means that crystallinity is so good that these values are large.

The Cl contents are analyzed by High Pressure Ion Chromatography (HP-IC) using Thermo scientific ICS 5000/Suppressed conductivity equipment, by mixing 0.5 g of powder and 5 mL of DI water, keeping the resultant in a bath at 85° C. for 1 hour, and measuring under the conditions of flow rate (1.0 mL/min), solvent (DI water KOH), and SPL loop size (25 µL).

TABLE 3

| BT Powder | Dielectric constant | DF (Dissipation Factor) (%) | Resistivity (Ω · m) | Apparent density (g/cm$^3$) |
|---|---|---|---|---|
| BT1 | 2054 | 0.83 | 2.83E+13 | 5.81 |
| BT 2 | 2265 | 0.91 | 3.30E+13 | 5.88 |
| BT 3 | 2285 | 0.94 | 3.01E+13 | 5.84 |
| BT 4 | 2298 | 0.97 | 3.34E+13 | 5.87 |
| BT 5 | 1829 | 0.62 | 2.53E+13 | 5.84 |

Figure 4:
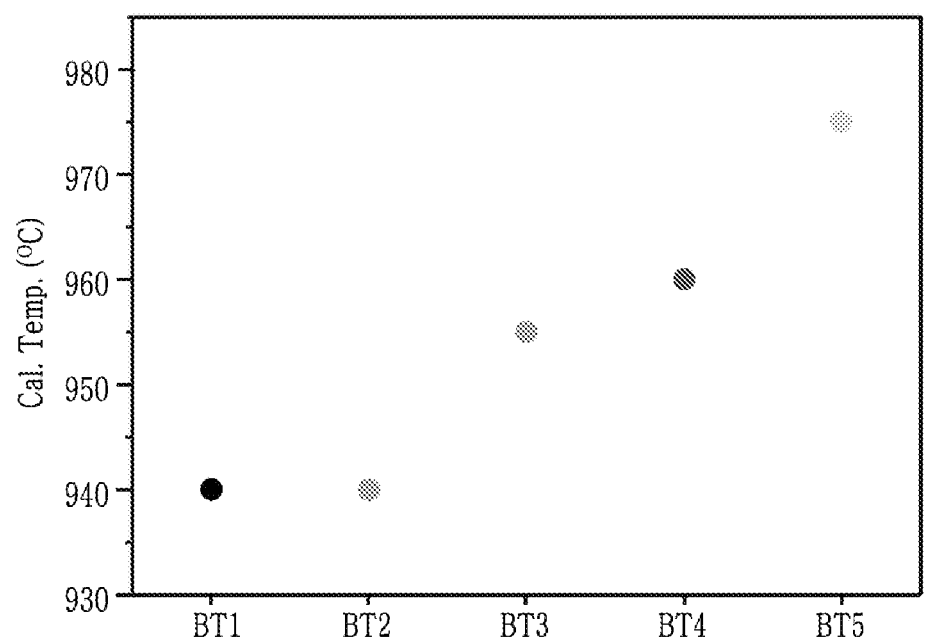
FIG. 4 is a graph showing calcination temperatures of the dielectric powder.
Figure 5:
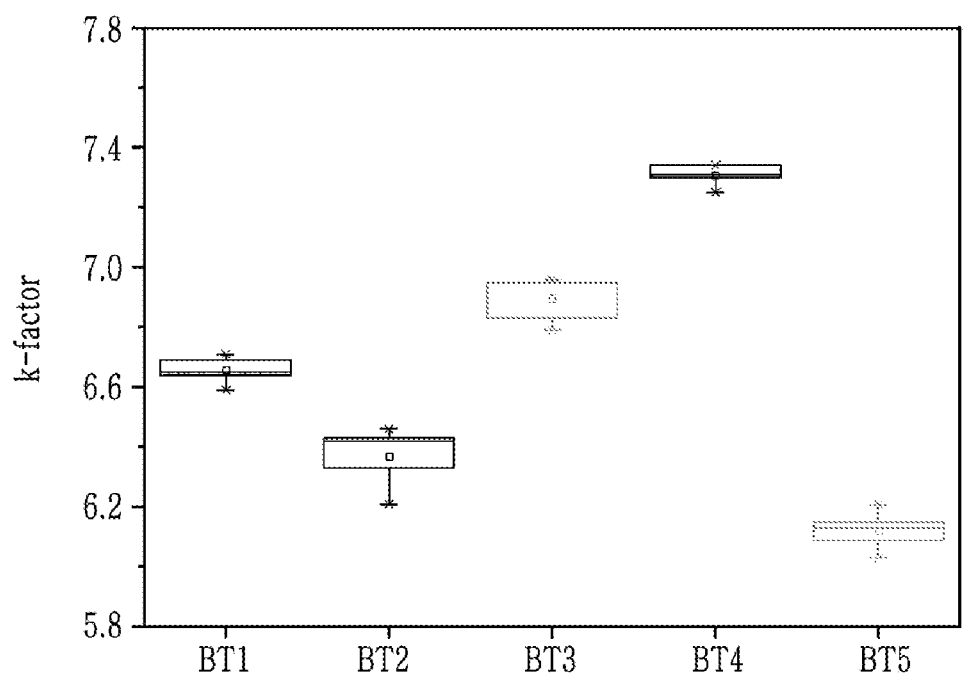
FIG. 5 is a graph showing the crystallinity of dielectric powder.
Figure 6:
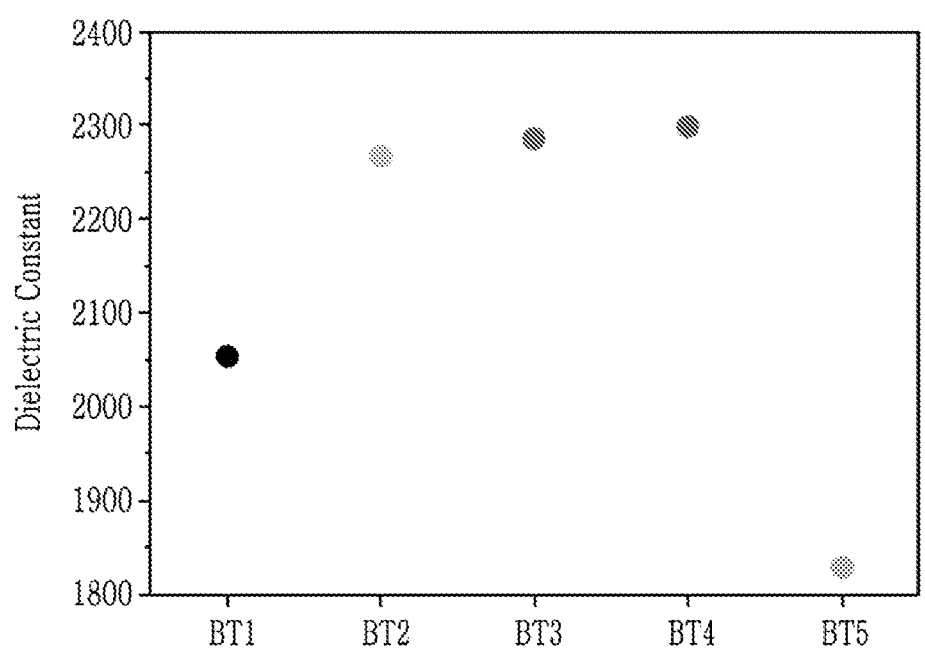
FIG. 6 is a graph showing dielectric constant characteristics of dielectric powder.

The dielectric constants are obtained by preparing five sintered specimens of 1×1×0.6 mm (L*W*T) or less in size each of which are coated with silver electrodes using E4980A (Keysight technologies), an LCR meter (Inductance, Capacitance, Resistance), and measuring the dielectric constants of five sintered specimens using a measuring Zig (16034E) under the conditions of 1 kHz and 1 V to calculate the average values. Referring to Table 2, Table 3, and FIGS. 4 and 5, barium titanates BT2 to BT4 having a Cl content of about 0.005 to 0.065 wt % exhibit excellent crystallinity and dielectric constant.

Accordingly, multilayered capacitors are manufactured using the BT2 to BT4 as main components and reliability evaluation thereof is attempted.

EXAMPLES

Examples 2-1 to 2-9: Manufacture of Multilayered Capacitors Including BT2 as Main Component The composition shown in Table 4 is used as subcomponents along with barium titanate powder BT2 as the main component of the dielectric base material. The contents of subcomponents are expressed as the number of moles relative to 100 moles of the main component.

Zirconium balls (ZrO$_2$ balls) are used as a dispersion medium for the main component powder and subcomponent powder of the dielectric base material, and ethanol/toluene, a dispersant, and a binder are mixed therewith, mechanical milling is performed to obtain a dielectric slurry.

Dielectric green sheets are manufactured by using the prepared slurry for dielectric using an on-roll forming coater of a head discharge method.

A conductive paste layer including nickel (Ni) is printed on the surface of the dielectric green sheet, and the dielectric green sheets (width×length×height=3.2 mm×2.5 mm×2.5 mm) on which the conductive paste layer is formed are stacked and compressed to form a dielectric green sheet stack.

Multilayered capacitors according to examples and comparative examples are manufactured by firing the dielectric green sheet stack under the conditions of a firing temperature of 1300° C. or less and a hydrogen concentration of 1.0% H$_2$ or less through a firing process at 400° C. or less in a nitrogen atmosphere.

Examples 3-1 to 3-9: Manufacture of Multilayered Capacitors Including BT3 as Main Component Multilayered capacitors are manufactured in the same manner as in Examples 2-1 to 2-9, except that BT3 is used instead of barium titanate powder BT2 as the main component of the dielectric base material.

The specific compositions are shown in Table 5 as the number of moles of subcomponents relative to 100 parts by mole of the main component.

Examples 4-1 to 4-9: Manufacture of Multilayered Capacitors Including BT4 as Main Component Multilayered capacitors were manufactured in the same manner as in Examples 2-1 to 2-9, except that BT4 was used instead of the barium titanate powder BT2 as the main component of the dielectric base material.

The specific compositions are shown in Table 6 in terms of the number of moles of the subcomponent relative to 100 parts by mole of the main component.

TABLE 4

| NO | BaTiO$_3$ | Dy$_2$O$_3$ | MnO$_2$ | V$_2$O$_5$ | BaCO$_3$ | SiO$_2$ | Al$_2$O$_3$ | ZrO$_2$ |
|---|---|---|---|---|---|---|---|---|
| Example 2-1 | BT2 | 1.0 | 0.1 | 0.1 | 1.5 | 0.75 | 0.5 | 0 |
| Example 2-2 | | 1.5 | 0.1 | 0.1 | | | | 0 |
| Example 2-3 | | 2.0 | 0.1 | 0.1 | | | | 0 |
| Example 2-4 | | 2.0 | 0.15 | 0.1 | | | | 0 |
| Example 2-5 | | 2.0 | 0.2 | 0.1 | | | | 0 |
| Example 2-6 | | 2.0 | 0.15 | 0.15 | | | | 0 |
| Example 2-7 | | 2.0 | 0.15 | 0.2 | | | | 0 |
| Example 2-8 | | 2.0 | 0.15 | 0.2 | | | | 1.0 |
| Example 2-9 | | 2.0 | 0.15 | 0.2 | | | | 1.5 |

TABLE 5

| NO | BaTiO$_3$ | Dy$_2$O$_3$ | MnO$_2$ | V$_2$O$_5$ | BaCO$_3$ | SiO$_2$ | Al$_2$O$_3$ | ZrO$_2$ |
|---|---|---|---|---|---|---|---|---|
| Example 3-1 | BT3 | 1.0 | 0.1 | 0.1 | 1.5 | 0.75 | 0.5 | 0 |
| Example 3-2 | | 1.5 | 0.1 | 0.1 | | | | 0 |
| Example 3-3 | | 2.0 | 0.1 | 0.1 | | | | 0 |
| Example 3-4 | | 2.0 | 0.15 | 0.1 | | | | 0 |
| Example 3-5 | | 2.0 | 0.2 | 0.1 | | | | 0 |
| Example 3-6 | | 2.0 | 0.15 | 0.15 | | | | 0 |
| Example 3-7 | | 2.0 | 0.15 | 0.2 | | | | 0 |
| Example 3-8 | | 2.0 | 0.15 | 0.2 | | | | 1.0 |
| Example 3-9 | | 2.0 | 0.15 | 0.2 | | | | 1.5 |

TABLE 6

| NO | BaTiO$_3$ | Dy$_2$O$_3$ | MnO$_2$ | V$_2$O$_5$ | BaCO$_3$ | SiO$_2$ | Al$_2$O$_3$ | ZrO$_2$ |
|---|---|---|---|---|---|---|---|---|
| Example 4-1 | BT4 | 1.0 | 0.1 | 0.1 | 1.5 | 0.75 | 0.5 | 0 |
| Example 4-2 | | 1.5 | 0.1 | 0.1 | | | | 0 |
| Example 4-3 | | 2.0 | 0.1 | 0.1 | | | | 0 |
| Example 4-4 | | 2.0 | 0.15 | 0.1 | | | | 0 |
| Example 4-5 | | 2.0 | 0.2 | 0.1 | | | | 0 |
| Example 4-6 | | 2.0 | 0.15 | 0.15 | | | | 0 |
| Example 4-7 | | 2.0 | 0.15 | 0.2 | | | | 0 |
| Example 4-8 | | 2.0 | 0.15 | 0.2 | | | | 1.0 |
| Example 4-9 | | 2.0 | 0.15 | 0.2 | | | | 1.5 |

Experimental Examples

Figure 9:
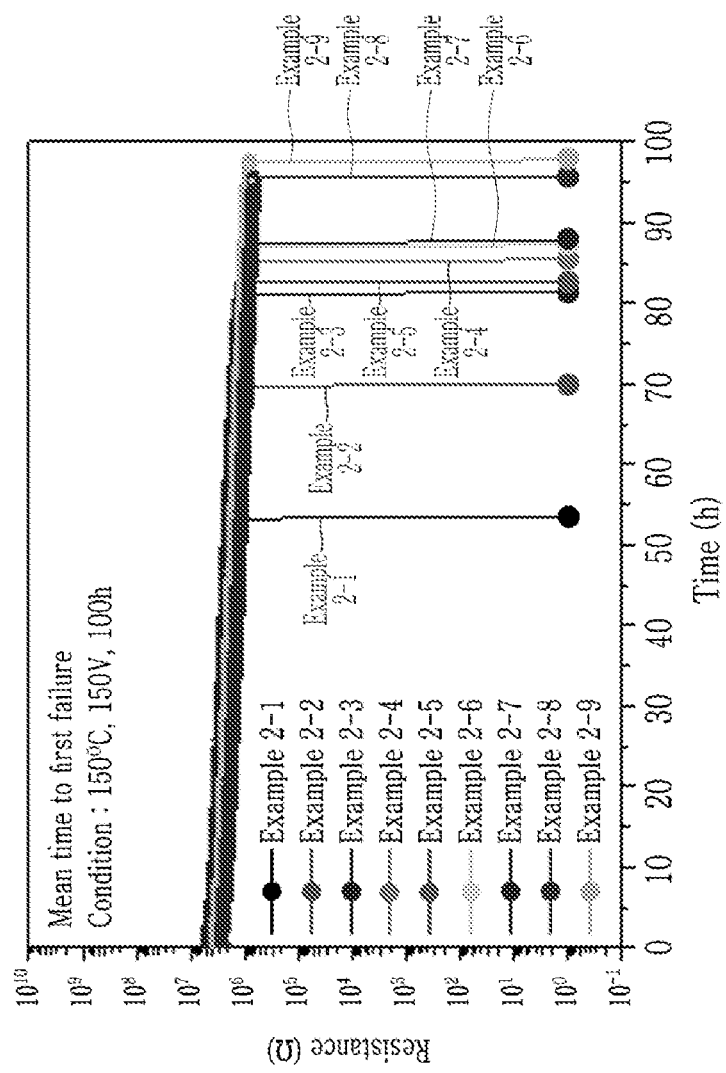
FIG. 9 is a graph showing resistance impedance measurement results of grain boundary including dielectric powder as a main component according to one example.
Figure 10:
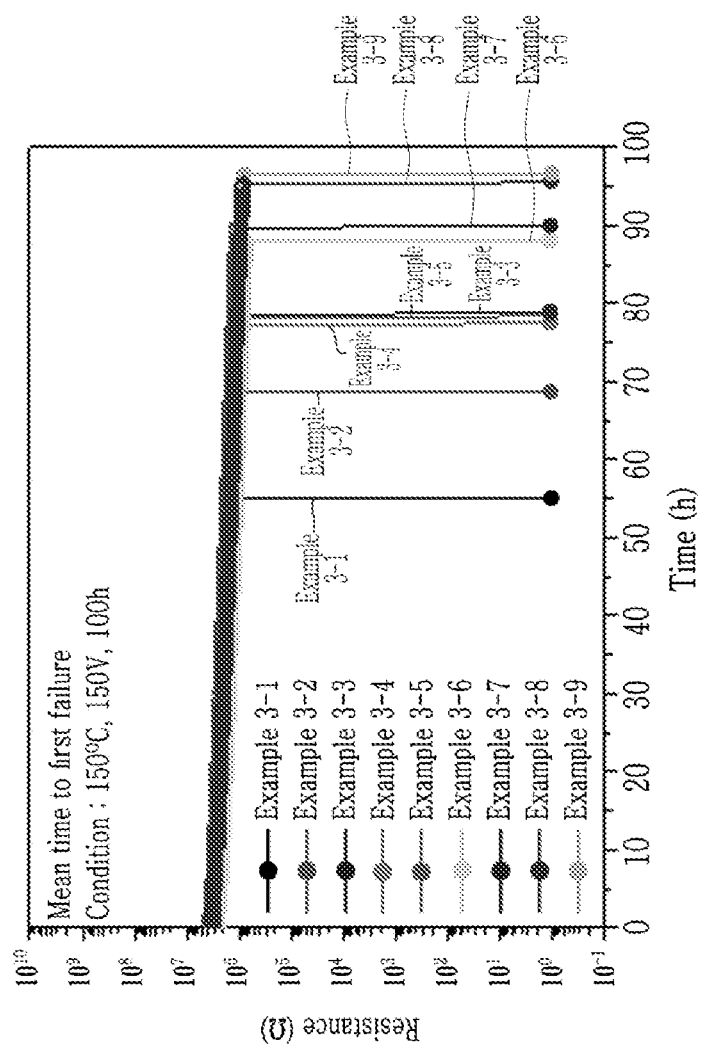
FIG. 10 is a graph showing resistance impedance measurement results of grain boundary including dielectric powder as a main component according to another example.
Figure 11:
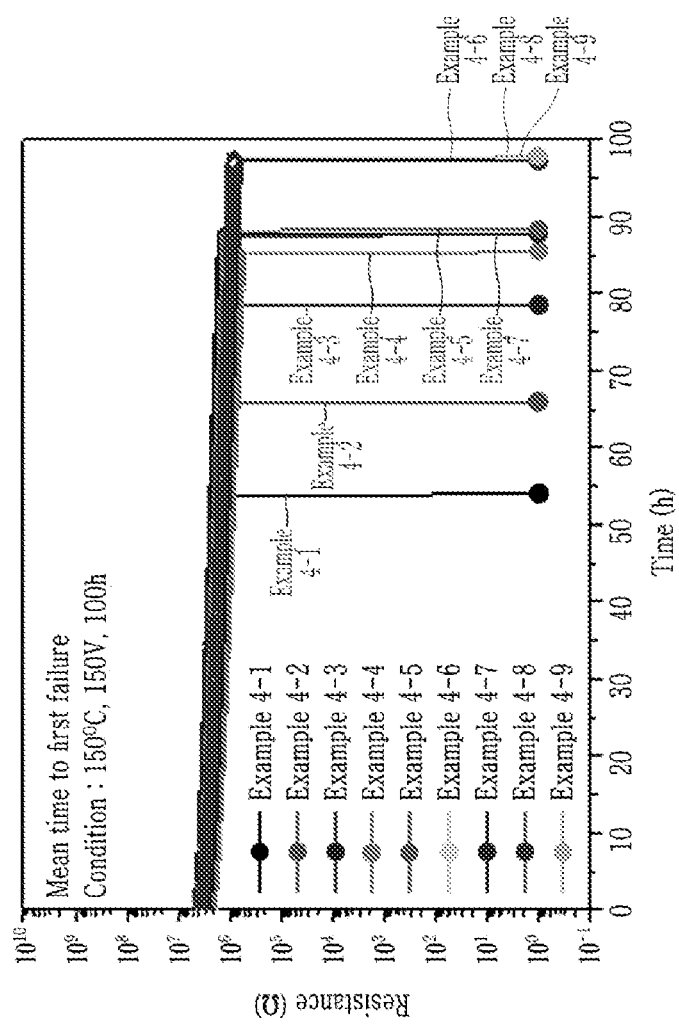
FIG. 11 is a graph showing resistance impedance measurement results of grain boundary including dielectric powder as a main component according to another example.

The reliability under high-temperature severe conditions and moisture resistance reliability of the multilayered capacitor manufactured in examples are evaluated, and the results are shown in Table 7 and FIGS. 9 to 11.

40 multilayered capacitors manufactured in examples and comparative examples are prepared, mounted on a regular board, and reliability under high-temperature severe conditions (HALT) is measured under the conditions of 150° C., 150 hours, 100 V using ESPEC (PV-222, HALT) equipment and moisture resistance reliability is measured under the conditions of 85° C., relative humidity (R.H.) of 85%, 32 V, and 24 hours using ESPEC (PR-3J, 8585) equipment.

FIG. 9 is a graph showing resistance impedance measurement results of grain boundary including dielectric powder as a main component according to one example.

FIG. 10 is a graph showing resistance impedance measurement results of grain boundary including dielectric powder as a main component according to another example.

FIG. 11 is a graph showing resistance impedance measurement results of grain boundary including dielectric powder as a main component according to another example.

TABLE 7

| | Dielectric Constant | Reliability under high-temperature severe conditions (Mean time to first failure) (h) | Reliability under high-temperature severe conditions (Mean time between first failure) (h) | Moisture resistance reliability (failure time) (h) |
|---|---|---|---|---|
| Example 2-1 | 2873 | 54 | 62 | No short |
| Example 2-2 | 2715 | 69 | 76 | No short |
| Example 2-3 | 2572 | 81 | 85 | No short |
| Example 2-4 | 2525 | 85 | 89 | No short |
| Example 2-5 | 2489 | 82 | 86 | No short |
| Example 2-6 | 2510 | 87 | 92 | No short |
| Example 2-7 | 2488 | 87 | 91 | No short |
| Example 2-8 | 2554 | 97 | 99 | No short |
| Example 2-9 | 2615 | 95 | 97 | No short |
| Example 3-1 | 2902 | 55 | 66 | No short |
| Example 3-2 | 2798 | 68 | 74 | No short |
| Example 3-3 | 2611 | 78 | 85 | No short |
| Example 3-4 | 2555 | 77 | 85 | No short |
| Example 3-5 | 2552 | 78 | 81 | No short |
| Example 3-6 | 2548 | 88 | 93 | No short |
| Example 3-7 | 2429 | 89 | 93 | No short |
| Example 3-8 | 2447 | 96 | 99 | No short |
| Example 3-9 | 2504 | 95 | 98 | No short |
| Example 4-1 | 2911 | 53 | 63 | No short |
| Example 4-2 | 2784 | 65 | 72 | No short |
| Example 4-3 | 2747 | 78 | 84 | No short |
| Example 4-4 | 2811 | 85 | 89 | No short |
| Example 4-5 | 2721 | 85 | 88 | No short |
| Example 4-6 | 2654 | 88 | 93 | No short |
| Example 4-7 | 2458 | 87 | 93 | No short |
| Example 4-8 | 2557 | 97 | 99 | No short |
| Example 4-9 | 2601 | 97 | 99 | No short |

In more detail, FIG. 9 is a graph showing resistance impedance measurement results of grain boundary including dielectric powder as a main component according to Examples 2-1 to 2-9 as a main component, FIG. 10 is a graph showing resistance impedance measurement results of grain boundary including dielectric powder as a main component according to Examples 3-1 to 3-9 as a main component, and FIG. 11 is a graph showing resistance impedance measurement results of grain boundary including dielectric powder as a main component according to Examples 4-1 to 4-9. Referring to Table 7 and FIGS. 9 to 11, It can be seen that the multilayered capacitor manufactured in Examples 2-1 to 2-9, Examples 3-1 to 3-9, and Examples 4-1 to 4-9 exhibited excellent reliability under high-temperature severe conditions and moisture resistance reliability.

While this disclosure has been described in connection with what is presently considered to be practical example embodiments, it is to be understood that the disclosure is not limited to the disclosed embodiments. On the contrary, it is intended to cover various modifications and equivalent arrangements included within the spirit and scope of the appended claims.

What is claimed is:

1. A multilayered capacitor, comprising:
   a capacitor body including a dielectric layer and an internal electrode; and
   an external electrode disposed outside the capacitor body,
   wherein the dielectric layer includes a plurality of dielectric crystal grains,
   the dielectric crystal grains include barium titanate as a main component and $Dy_2O_3$ as a subcomponent,
   the barium titanate includes about 0.005 to about 0.065 wt % of Cl, and
   about 1.0 to about 3.0 parts by mole of $Dy_2O_3$, about 0 to about 0.3 parts by mole of $MnO_2$, about 0 to about 0.3 parts by mole of $V_2O_5$, about 0 to about 2.0 parts by mole of $BaCO_3$, about 0 to about 1.0 part by mole of $SiO_2$, about 0 to about 0.6 parts by mole of $Al_2O_3$, and about 0 to about 2.0 parts by mole of $ZrO_2$ are included based on 100 parts by mole of the main component.

2. The multilayered capacitor of claim 1, wherein the barium titanate includes about 0.01 to about 0.065 wt % of Cl.

3. The multilayered capacitor of claim 1, wherein about 1.0 to about 2.0 parts by mole of $Dy_2O_3$, about 0.1 to about 0.2 parts by mole of $MnO_2$, about 0.1 to about 0.2 parts by mole of $V_2O_5$, about 0.1 to about 1.5 parts by mole of $BaCO_3$, about 0.1 to about 0.75 parts by mole of $SiO_2$, about 0.1 to about 0.5 parts by mole of $Al_2O_3$, and 0.1 parts by mole to 1.5 parts by mole of $ZrO_2$ are included based on 100 parts by mole of the main component.

4. The multilayered capacitor of claim 1, wherein about 1.0 to about 1.5 parts by mole of $ZrO_2$ is included based on 100 parts by mole of the main component.

5. The multilayered capacitor of claim 1, wherein the subcomponent is included in an amount of about 3.0 to about 7.0 parts by mole based on 100 parts by mole of the main component.

6. The multilayered capacitor of claim 1, wherein the main components includes $BaTiO_3$, $Ba(Ti, Zr)O_3$, $Ba(Ti, Sn)O_3$, $(Ba, Ca)TiO_3$, $(Ba, Ca)(Ti, Zr)O_3$, $(Ba, Ca)(Ti, Sn)O_3$, $(Ba, Sr)TiO_3$, $(Ba, Sr)(Ti, Zr)O_3$, $(Ba, Sr)(Ti, Sn)O_3$, or a combination thereof.

7. A method for manufacturing a multilayered capacitor, comprising:
   preparing a dielectric powder including barium titanate including about 0.005 to about 0.065 wt % of Cl as a main component;
   mixing about 3.0 to about 7.0 parts by mole of a subcomponent including $Dy_2O_3$ based on 100 parts by mole of the main component to prepare a dielectric green sheet using a mixture of the main component and subcomponent, and forming a conductive paste layer on a surface of the dielectric green sheet;
   stacking the dielectric green sheets on which the conductive paste layer is formed to manufacture a dielectric green sheet stack;
   firing the dielectric green sheet stack to manufacture a capacitor body; and
   forming an external electrode on one surface of the capacitor body,
   wherein the preparing of the dielectric powder includes:
     preparing a raw material mixture by wet-mixing a barium (Ba) precursor including about 0 to about 0.1 wt % of Cl and a titanium (Ti) precursor including about 0 to about 0.08 wt % of Cl, and
     calcining the raw material mixture to prepare a dielectric powder.

8. The method of claim 7, wherein the subcomponent further includes at least one of $MnO_2$, $V_2O_5$, $BaCO_3$, $SiO_2$, $Al_2O_3$, and $ZrO_2$.

9. The method of claim 7, wherein about 0 to about 3.0 parts by mole of $Dy_2O_3$, about 0 to about 0.3 parts by mole of $MnO_2$, about 0 to about 0.3 parts by mole of $V_2O_5$, about 0 to about 2.0 parts by mole of $BaCO_3$, about 0 to about 1.0 part by mole of $SiO_2$, about 0 to about 0.6 parts by mole of $Al_2O_3$, and about 0 to about 2.0 parts by mole of $ZrO_2$ are included based on 100 parts by mole of the main component.

10. The method of claim 9, wherein about 1.0 to about 1.5 parts by mole of $ZrO_2$ is included based on 100 parts by mole of the main component.

11. The method of claim 7, wherein the preparing of the dielectric powder further includes drying and dry-grinding the raw material mixture.

12. The method of claim 7, wherein the preparing of the dielectric powder further includes wet-grinding the dielectric powder, followed by drying and dry-grinding.

13. The method of claim 7, wherein the barium (Ba) precursor includes $BaO_2$, $BaTiO_3$, $BaCO_3$, BaO, or a combination thereof.

14. The method of claim 7, wherein the titanium (Ti) precursor includes titanium dioxide, titanium diisopropoxide diacetyl acetonate (TPA), titanium alkoxide, or a combination thereof.

15. The method of claim 7, wherein the calcining is performed at about 500° C. to about 1000° C. for about 0.5 hour to about 3 hours under a vacuum or normal pressure atmosphere.

16. The method of claim 7, wherein the calcining includes a first calcining at about 600° C. to about 900° C. for about 0.5 hours to about 3 hours and a second calcining at about 700° C. to about 1,000° C. for about 0.5 hours to about 3 hours.

17. The method of claim 16, wherein the first calcining and the second calcining are performed continuously or discontinuously.

18. The method of claim 7, wherein the dielectric green sheet is manufactured by mixing the mixture of the main component and subcomponent with a solvent and an additive to prepare a dielectric slurry, and molding the dielectric slurry into a sheet shape.

19. A method for manufacturing a multilayered capacitor, comprising
   preparing a dielectric powder including barium titanate including about 0.005 to about 0.065 wt % of Cl as a main component;
   mixing about 3.0 to about 7.0 parts by mole of a subcomponent including $Dy_2O_3$ based on 100 parts by mole of the main component to prepare a dielectric green sheet using a mixture of the main component and subcomponent, and forming a conductive paste layer on a surface of the dielectric green sheet;

stacking the dielectric green sheets on which the conductive paste layer is formed to manufacture a dielectric green sheet stack;

firing the dielectric green sheet stack to manufacture a capacitor body; and forming an external electrode on one surface of the capacitor body, wherein, about 0 to about 3.0 parts by mole of $Dy_2O_3$, about 0 to about 0.3 parts by mole of $MnO_2$, about 0 to about 0.3 parts by mole of $V_2O_5$, about 0 to about 2.0 parts by mole of $BaCO_3$, about 0 to about 1.0 part by mole of $SiO_2$, about 0 to about 0.6 parts by mole of $Al_2O_3$, and about 0 to about 2.0 parts by mole of $ZrO_2$ are included based on 100 parts by mole of the main component.

* * * * *